Jan. 27, 1970           M. FRAM           3,491,443
ROVING CUTTER WITH SELF-ADJUSTING CUTTER ROLLER
Filed Oct. 28, 1966           3 Sheets-Sheet 1
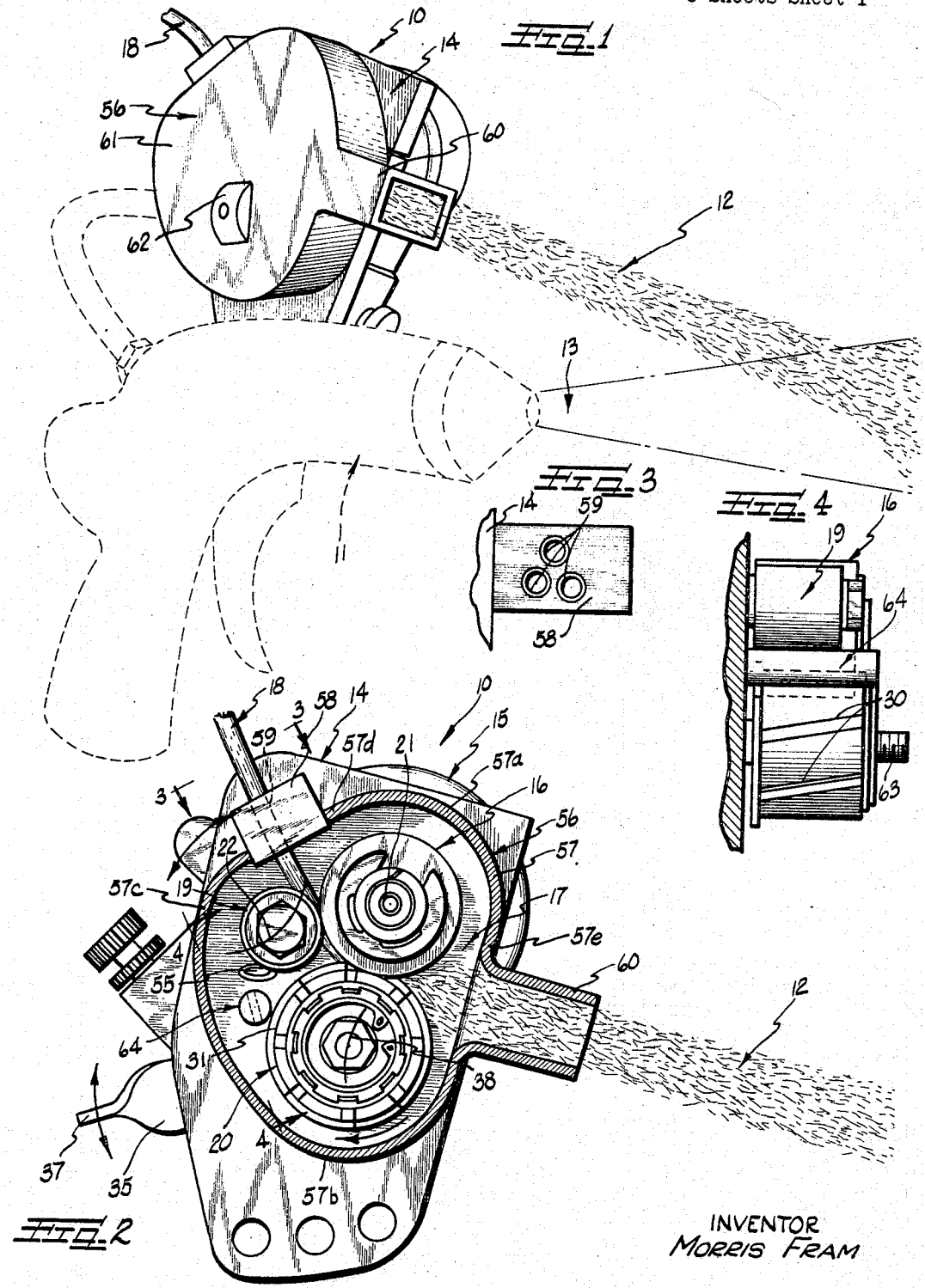
INVENTOR
MORRIS FRAM
BY Marzall, Johnston, Cook & Root ATTYS.

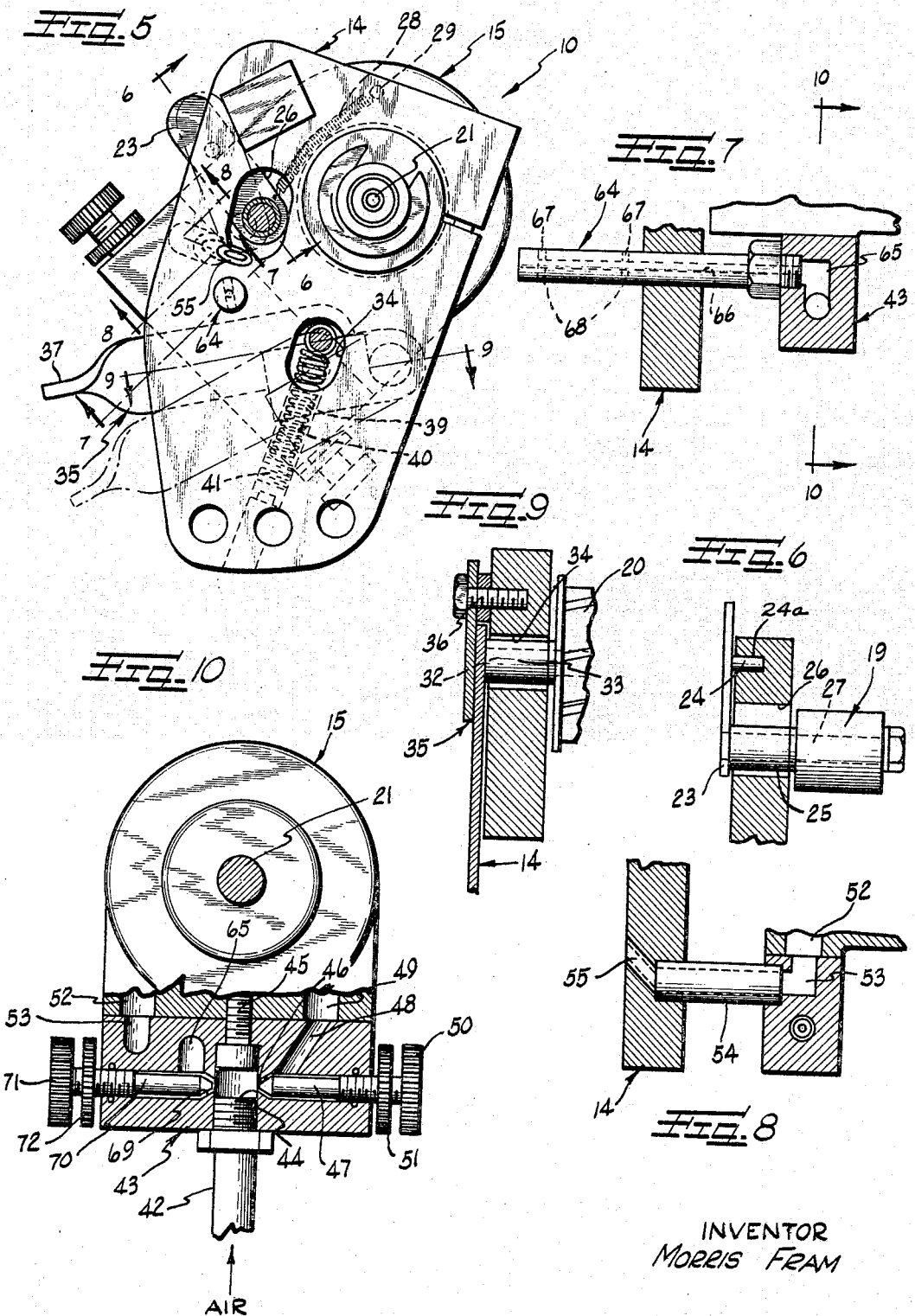

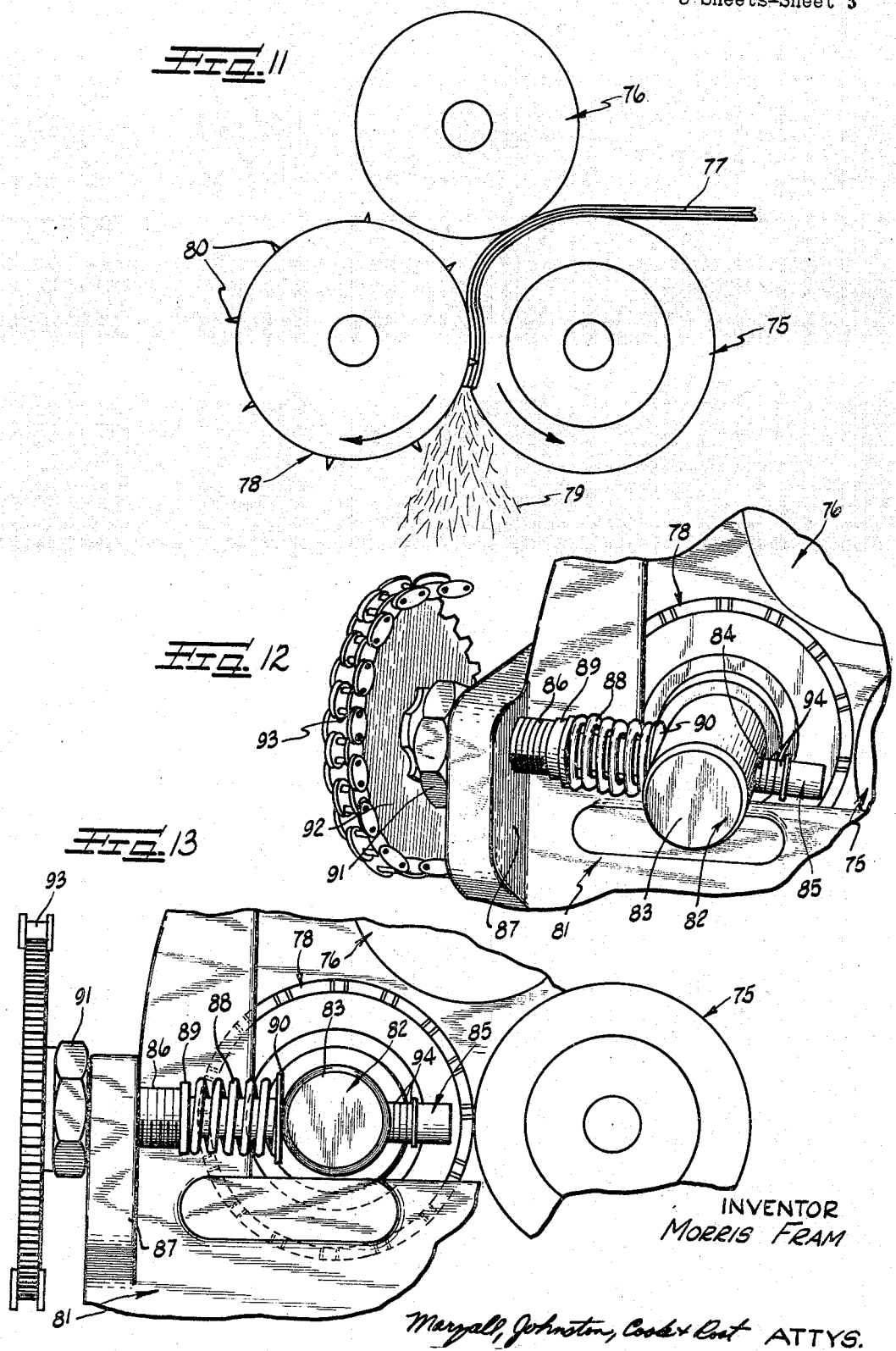

United States Patent Office 3,491,443
Patented Jan. 27, 1970

3,491,443
ROVING CUTTER WITH SELF-ADJUSTING
CUTTER ROLLER
Morris Fram, 9765 Shadon Island Drive,
Sunland, Calif. 91040
Filed Oct. 28, 1966, Ser. No. 590,394
Int. Cl. B25f 3/00
U.S. Cl. 30—128                                5 Claims

ABSTRACT OF THE DISCLOSURE

The present invention relates in general to a roving cutter for cutting continuous glass fiber roving or the like into predetermined lengths, and more particularly to a glass roving cutter having a self-adjusting cutter roller to give improved performance and reduce maintenance. The cutter roller is spring biased against a back-up roller to produce uniform cutting pressure.

---

Glass fibers are added to and mixed with a wide variety of materials to improve their strength and wear resistance properties, and in particular are used extensively in the reinforced plastics industry. It is well known that cut glass roving mixed with a polyester resin provides a very desirable construction material for many purposes. For example, many boats and car bodies presently use reinforced glass fiber construction. Cut glass fibers are also added to gypsum board.

Glass roving is presently produced in the form of continuous filaments collected into a bundle or strand that may contain as many as 200 to 400 individual filaments. The roving is cut into predetermined lengths, and most generally short lengths of approximately one-half to one inch immediately before being added or mixed to a plastic to reinforce same.

In order to cut the roving, a roving cutter is employed. A typical roving cutter would include a cutter roller having a plurality of cutting blades thereon in engagement with a resilient back-up roller and between which passes the roving. A pressure roller serves to engage the back-up roller and feed the roving to the back-up and cutter rollers. The mountings for all of the rollers are fixed relative to one another. Such a typical roving cutter is shown in U.S. Patent 3,034,213. The cutter roller usually operates at a speed in the range of 100 to 3000 revolutions per minute, and as the blades on the cutter roller press the roving against the resilient back-up roller, the glass filaments are forced to take a sharp bend to break or sever same thereby producing cut roving.

The resilient back-up roller is actually flexed, especially at the surface, by engagement with the cutter blades on the cutter roller, and thereafter becomes hot and soft from continued flexing whereby the cutting pressure between the cutter roller and back-up roller is reduced. Further, the constant flexing and engagement of the back-up roller by the cutter blades causes wear on the back-up roller to reduce the cutting pressure between the cutter roller and back-up roller. The cutting pressure is somewhat critical, and therefore the adjustment between the cutter roller and back-up roller is critical, whereby a few thousandths of an inch spacing between the rollers makes a substantial difference in the performance of the cutter. Thus, in order to obtain proper performance, it is necessary to re-adjust the cutting pressure from time to time.

The operator of a roving cutter cannot accurately determine the proper adjustment required for satisfactory operation, and therefore usually adjusts the cutting pressure until the cutter cuts the roving and then estimates an increased pressure adjustment to compensate for wear. It has been found in the past that the operator often either adds too much pressure thereby greatly reducing the life of the resilient back-up roller, or applies too little pressure so that cutting or chopping stops after a short period of further operation and requires further adjustment.

The roving cutter of the present invention overcomes these difficulties by mounting the cutter roller so that it is spring biased against the resilient back-up roller to produce uniform cutting pressure and therefore compensate for wear and flexing of the back-up roller. Such eliminates the need of constant cutting pressure adjustments while producing the proper cutting action to obtain the required performance of the cutter.

Moreover, the pressure roller of the cutter according to the present invention may be mounted to be spring biased against the back-up roller and compensate for flexing and wear of the back-up roller to provide the necessary feed pressure for the roving to properly feed the roving to the cutter roller and back-up roller. Finally, the cutting chamber in some embodiments may be constructed and provided with air streams to guide the roving from the pressure roller and back-up roller to the cutter roller and back-up roller, and to discharge the cut roving from the chamber.

Accordingly, it is an object of the present invention to provide a new and improved roving cutter for cutting of glass fiber roving to add or mix same with a plastic or the like in the construction of a product.

Another object of the present invention is in the provision of a roving cutter including a resilient back-up roller, and a cutter roller coacting with the back-up roller to receive and cut roving, wherein means is provided to automatically compensate for flexing and wear of the back-up roller during operation of the cutter to automatically adjust and maintain the cutting pressure substantially uniform and sustain proper cutting action and performance.

A further object of the present invention resides in the provision of a roving cutter for cutting glass roving into predetermined lengths which includes a back-up roller of resilient material driven at a selected speed having a cutter roller in engagement therewith to receive and cut glass roving, and a pressure roller in engagement with the back-up roller to receive and feed roving to the cutter roller and back-up roller, wherein the cutter roller and pressure roller are mounted to compensate for wear and flexing of the back-up roller and sustain continued and proper operation.

A still further object of this invention is in the provision of a roving cutter including a driven resilient back-up roller coacting with a spring mounted cutter roller engaging therewith to compensate for wear and flexing of the back-up roller to obtain substantially uniform cutting pressure and the necessary cutting action.

A still further object of the invention is to provide a roving cutter having a spring mounted pressure roller coacting with the back-up roller to feed glass roving to the cutting roller and back-up roller.

Another object of this invention is in the provision of a roving cutter including a resilient back-up roller coacting with a spring mounted cutter roller and a spring mounted pressure roller within a closed cutting chamber, wherein the cutting chamber is so formed and provided with air streams to guide movement of the roving between the back-up roller and pressure roller to the back-up roller and cutter roller and to effect proper discharge of the cut roving through a nozzle communicating with the cutting chamber.

Other objects, features and advantages of the invention will be apparent from the following detailed disclosure, taken in conjunction with the accompanying sheets of drawings, wherein like reference numerals refer to like parts, in which:

FIG. 1 is a perspective view of a roving cutter according to the present invention shown mounted on a spray gun in phantom;

FIG. 2 is a side elevational view of the roving cutter of the present invention with a part of the cutting chamber cover shown in section to illustrate underlying parts;

FIG. 3 is a view taken substantially along line 3—3 of FIG. 2 illustrating the roving inlet to the cutting chamber of the roving cutter according to the present invention;

FIG. 4 is a view taken substantially along line 4—4 of FIG. 2 illustrating the roller arrangement;

FIG. 5 is a view similar to FIG. 2, but with many parts omitted to show underlying parts and some parts shown in solid and phantom to indicate possible movement;

FIG. 6 is a sectional view taken substantially along line 6—6 of FIG. 5;

FIG. 7 is a sectional view taken substantially along line 7—7 of FIG. 5;

FIG. 8 is a sectional view taken substantially along line 8—8 of FIG. 5;

FIG. 9 is a sectional view taken substantially along line 9—9 of FIG. 5;

FIG. 10 is a partial sectional view taken substantially along line 10—10 of FIG. 7; and FIGS. 11, 12 and 13 show another form of the invention, wherein FIG. 11 illustrates diagrammatically the arrangement of the rollers, FIG. 12 shows a fragmentary perspective view of cutter roller tensioning means, and FIG. 13 shows a fragmentary side elevational view of the cutter roller tensioning means.

Referring now to the drawings, and particularly to the embodiment of FIGS. 1–10, the roving cutter is generally indicated by the numeral 10, and is shown as it would be generally used with a spray gun 11, wherein the cutter 10 would be mounted directly on the spray gun to chop or cut glass fiber roving into predetermined lengths and discharge a stream of cut roving 12 for adding to or mixing with a stream of plastic such as a polyester resin discharged from the spray gun 11, all for application onto a surface for the construction of a reinforced plastic. It should be appreciated that the roving cutter 10 may be employed by itself for any suitable purpose and where it is desired to produce a stream of cut roving.

The roving cutter 10 includes generally a mounting plate 14 for supporting the working parts in interrelation, and having associated therewith a motor 15 on one side driving a back-up roller 16 on the other side which is arranged within a cutting chamber 17. In general, glass roving in continuous strand or bundle and identified by the numeral 18 is introduced into the cutting chamber 17 to the inlet end of a bight defined by the back-up roller 16 and a pressure roller 19. The roving is discharged from the outlet end of the bight between the back-up and pressure rollers and fed to a bight defined by the back-up roller 16 and a cutter roller 20. As the roving passes between the back-up and cutter rollers, it is cut into predetermined lengths and discharged from the cutting chamber 17.

While the invention is described with back-up roller 16 being motor driven, it should be understood that cutter roller 20 could be driven instead of back-up roller 16. This arrangement is not as satisfactory, however, in that there is greater strain on the delicate cutter blades.

The motor 15 is pneumatic, although it should be appreciated that it could be of any other type, but the pneumatic motor is preferable here inasmuch as compressed air is also employed within the cutting chamber 17 for proper operation of the cutter. A shaft 21 is provided for the motor 15 and which extends through an opening formed in the mounting plate 14, and the back-up roller 16 is suitably secured thereon for corotation therewith. The back-up roller 16 is of resilient material, and preferably of rubber or the like. It should be appreciated that while the back-up roller is directly driven from the motor 15, it transmits a driving force to the pressure and cutter rollers 19 and 20 by virtue of engagement with these rollers. The surface of the back-up roller 16 is smooth except that it will with wear be somewhat roughened by engagement with the cutter roller 20.

Means is provided for mounting the pressure roller 19 so that it is resiliently biased toward the back-up roller 16 and along the arc 22 (FIG. 2) which includes a lever 23 having a pin 24 at one end pivotally engaging in an opening 24a in the mounting plate 14. An arm 25 extends laterally from the lever 23 and at the end opposite the pivot pin 24, and into a slotted opening 26 extending through the mounting plate. A shaft 27 rotatably supporting the pressure roller 19 is suitably secured to the arm 25 so that the pressure roller is cantileverly supported. A spring 28 is fastened at one end to the lever 23 and at the other end to a pin 29 extending from the mounting plate 14 to continually urge the pressure roller toward the back-up roller so that the roving 18 is firmly gripped between the surfaces of the back-up and pressure rollers and fed onto the bight between the back-up and cutter rollers. The surface of the pressure roller 19 is smooth and preferably rigid and of a suitable metal. Thus, the wear and/or flexing of the back-up roller is compensated for automatically by the resilient mounting of the pressure roller 19.

The cutter roller 20 includes a plurality of cutting blades or knives 30 arranged along its peripheral surface in circumferentially spaced relationship. Preferably the cutting blade may have razor-like edges and which extend a slight distance from the surface 31 of the cutter roller. Further, the blades 30 are straight and mounted along a bias or along a plane that is non-parallel to the axis of rotation of the roller, as seen particularly in FIG. 4. The surface 31 of the cutter roller is prefrably rigid and may be of metal, plastic or the like.

The cutter roller 20 is rotatably mounted on a shaft 32 that is suitably connected to an arm 33 extending within a slotted opening 34 formed in the mounting plate 14. The back-up, pressure and cuter rollers are rotatable on substantially parallel axes. One or more of the roller axes may be toed in for some arrangements. The arm 33 is suitably secured to a lever 35 arranged on the side of the mounting plate away from the cutting chamber 17 and pivotally mounted at one end on a stub shaft 36 that is suitably anchored in the mounting plate 14. The lever 35 is provided with a finger engaging portion 37 at its outer end, FIG. 2, to facilitate manual movement of the cutter roller along the arc 38 when testing the tension on the cutter roller. In order to apply a biasing force to the cuter roller, a spring 39, FIG. 5, is arranged within a bore 40 formed in the mounting plate 14 and aligned with the slotted opening 34 and the cutter roller arm 33 so that the spring bottoms at one end on the arm 33. The other end of the spring 39 is bottomed on a set screw 41 threadedly received in the bore 40 and capable of adjusting the tension on the spring 39 and therefore the cutting pressure as the cutter roller 20 bears against the back-up roller 16. Thus, the cutting pressure may be adjusted by the set screw 41 and tested by feel on the lever 35, and a spring biased cutter roller will automatically compensate for wear and/or flexing of the back-up roller 16 during operation of the roving cutter.

Air for driving the motor 15 is supplied through a pipe or conduit 42 that is suitably secured into an air control block 43 having a common inlet 44 for receiving the air from the conduit 42. The air control block 43 is fastened to the pnuematic motor by means of a cap screw 45. A needle valve including a seat 46 and a needle element 47 communicates with the common inlet 44 and a passage 48 that leads to an air intake 49 of the motor 15. Thus, a needle valve is arranged between the air inlet of the air control block 43 and the air intake 49 of the motor to regulate the speed of the motor. A head 50 is provided on the needle element 47 in order to adjust same, and a locking nut 51 may be moved against the air control block 43 to lock the needle element in any desired position.

The motor 15 also includes an air exhaust 52 that communicates with a passage 53 in the air control block 43. A conduit or pipe 54 also communicates with the passage 53 and connects the air exhaust 52 into an air nozzle 55 arranged in the mounting plate 14 to discharge an air stream into the cutting chamber 17 between the pressure roller 19 and cutter roller 20 to continually urge the roving 18 against the back-up roller 16 and into the bight defined by the back-up and cutter rollers. Thus, the exhaust air from the motor is utilized to effect proper operation of the cutter in guiding the roving from the outlet end of the bight defined by the back-up and pressure rollers to the inlet end of the bight defined by the back-up and cutter rollers.

The cutting chamber 17 is defined by a cover member 56 that coacts with the mounting plate 14. The cover member 56 includes a substantially continuous wall 57 that is essentially arcuately formed and which extends substantially parallel to the rotational parallel axes of the rollers. The wall 57 includes an upper arcuate portion 57a formed generally concentric to the outer surface of the back-up roller 16, a lower arcuate section 57b that is substantially concentric to the outer surface of the cutter roller 20, and an intermediate arcuate section 57c that is substantially concentric to the outer surface of the pressure roller 19. A substantially straight section 57d extends between the arcuate sections 57a and 57c and has an opening for receiving a roving inlet guide block 58 that is supported on the mounting plate 14. As seen particularly in FIG. 3, the inlet block 58 includes a plurality of roving guide passages 59, any one or more of which may have roving extending therethrough at any time depending upon the desired quantity of cut roving to be discharged from the cutting chamber 17. A substantially straight section 57e is arranged between the arcuate sections 57a and 57b and has an opening therein and an integrally formed discharged nozzle 60 through which the cut roving 12 is discharged from the cutting chamber 17. While the discharge nozzle 60 is shown in FIGS. 1 and 2 as being rectangular in cross section and of uniform cross sectional shape throughout its shape, it should be appreciated that it could be of any desired geometrical shape and may even be shaped to define a predetermined cut roving stream. It should be further noticed that the roving inlet guide block 58 is aligned with the inlet end of the bight defined between the back-up and pressure rollers, while the discharge nozzle 60 is in alignment with the outlet end of the bight defined between the back-up and cutter rollers. The cover member 56 also includes a wall 61 that extends substantially parallel to the mounting plate 14, and which has rotatably fastened thereto a nut 62, FIG. 1, engageable on a threaded extension 63 of the cutter roller shaft 32 so that the cover member may be fastened in place agaisnt the mounting plate and over the rollers.

Coacting with the air nozzle 55 to define a positive pressure within the cutting chamber 17 for facilitating the discharge of cut roving therefrom is a blower nozzle 64 which extends through an opening formed in the mounting plate 14 and has its inlet end fastened to the air control block 43 (FIG. 7) and in communication with a passage 65 formed therein. The blower nozzle 64 includes an axially extending air passage 66 for feeding air to diametrically opposed air exhaust apertures 67 and 68 which are arranged within the cutting chamber 17 to direct streams of air in opposite directions along the inside surface of the cover member wall 57 thereby facilitating the compression of the stream of cut roving as it passes from the outlet end of the bight between the back-up and cutter rollers and the inlet end of the discharge nozzle 60 to further assure the proper discharge of all of the cut roving from the cutting chamber. A needle valve is arranged between the passage 65 and the common air inlet 44 in the air control block 43 and which includes a seat 69 coacting with a needle element 70 to adjust the amount of desired air pressure for the blower nozzle 64. In order to facilitate adjustment of the needle element 70, a head 71 is provided on the outer end. The needle valve element may be locked in any desired position by means of a lock nut 72 threadedly received on the element.

While the blower nozzle 64 operates to aid in discharge of cut roving when the enclosure or cover member is in position over the rollers, it should be appreciated that the roving cutter of the invention will operate properly where the blower nozzle is not in use and the cover member is off. Even then the cut roving will be discharged from the outlet end of the bight between the cutter and pressure rollers. In the absence of the cover member, the cut roving stream will be much larger in cross section, but in some uses may be more desirable.

The embodiment of FIGS. 11, 12 and 13 illustrates another form of the roving cutter according to the invention, and particularly to a form of roving cutter that would not be mounted on a spray gun but would be used for high capacity cutting. The feature of mounting the cutter roller to provide uniform cutting pressure when compensating for wear and other conditions, as described in the embodiment of FIGS. 1–10, is likewise employed in this embodiment. The further feature of determining the amount of cutting pressure by a visual observation of the parts is incorporated in this embodiment.

The roving cutter of this embodiment includes a back-up roller 75 in engagement with a pressure roller 76 defining a bight into which roving 77 is introduced and fed to a bight defined by the back-up roller 75 and a cutter roller 78. As in the first embodiment, the roving 77 is chopped or cut in the bight of the back-up and cutter rollers to define cut roving 79. Again, the pressure roller may have a substantially rigid face, while the back-up roller is preferably provided with a substantially resilient face. The face of the cutter roller 78 is substantially rigid and provided with a plurality of cutting blades 80 extending therefrom which effect the cutting of the roving as it passes through the bight between the back-up and cutter rollers.

While in the first embodiment, the pressure roller was biased into engagement with the back-up roller, it may either be arranged in fixed engagement with the back-up roller or spring biased into engagement with the back-up roller or gravitationally biased into engagement with the back-up roller. Where the pressure roller may be gravitationally biased, its shaft may be arranged for substantially vertical movement along guideways whereby the weight of the pressure roller effects biasing against the backup roller to provide the proper pressure therebetween for effecting the proper feed of the roving to the bight of the back-up and cutter rollers. Further, the back-up roller is preferably driven in the present embodiment as it is more simple to drive a roller that is not movable than to drive one that is movable such as the pressure and cutter rollers. Thus, a driving force is transmitted from the back-up roller to the pressure and cutter rollers causing them to suitably rotate at substantially the same speed during operation of the cutter.

All of the rollers are generally supported by a frame 81. The rotational axes of the rollers are similarly substantially parallel, although they may be toed in toward each other if desired. The cutter roller 78 includes a shaft 82 that extends beyond the opposite end faces of the roller to define mounting end supports 83. The cutter roller is suitably bearingly supported on the shaft 82. Each of the mounting end supports 83 is provided with a transversely extending hole 84 preferably arranged along a diameter for freely receiving a guide rod 85. The guide rod is attached at one end to a threaded shank 86 that is threadedly received in a frame part 87. A coil spring 88 is received on the guide rod 85 and bottomed at one end on a collar 89 and at the other end on a washer 90 that bears against the mounting end support 83. Thus, rotation of the threaded shank 86 in one direction causes movement of the collar 89 toward the back-up roller 75 and thereby transmits through the spring 88 and cutter roller mounting end supports 83 a tensioning force when the cutter roller 78 is in abutting relation with the back-up roller 75. Similarly, rotation of the threaded shank 86 in the other direction would cause a lessening of cutter roller pressure by allowing the spring 88 to expand. A locknut 91 is provided on the threaded shank 86 which coacts with the frame part 87 to lock the threaded shank in any desired position. Further, a sprocket 92 is secured to the threaded shank 86 and through a chain 93 connected to the sprocket for adjusting the spring tension at the other end of the cutter roller to thereby obtain substantially uniform spring pressure against the mounting end supports at both ends of the cutter roller.

In order to determine the cutter roller pressure, and to render the roving cutter in this embodiment capable of being easily and quickly initially adjusted for operation, a plurality of equally, axially spaced rings or annular grooves 94 are provided on the guide rod 85 adjacent the free end thereof, whereby the proper cutter roller pressure may be quickly and easily established when rotating the threaded shank 86 to tension the spring 88, by rotating the threaded shank until a predetermined number of rings or grooves 94 are visually observed adjacent the mounting end support 83. Instructions for adjusting spring pressure may accompany the roving cutter unit or may even be directly applied to the machine to enable the user to quickly and easily adjust the tension on the cutter roller. Therefore, problems of estimating the cutter roller pressure are eliminated. The spring mounting arrangement for the cutter roller automatically compensates for all conditions in service and is almost totally non-critical for adjustment. Once the adjustment of cutter pressure has been made, re-adjustment is never necessary regardless of disassembly and re-assembly for normal servicing of expendable parts.

It will be understood that modifications and variations may be effected without departing from the scope of the novel concepts of the present invention, but it is understood that this application is to be limited only by the scope of the appended claims.

The invention is hereby claimed as follows:

1. A roving cutter comprising, a mounting plate, a pneumatic motor having an air intake and an air exhaust attached to one side of the mounting plate and a drive shaft extending therethrough and at the other side thereof, a back-up roller having a resilient peripheral surface mounted on said shaft and driven thereby, a first opening in said mounting plate adjacent said back-up roller, a first arm spring mounted on said plate and extending into said first opening, a cutter roller supported by said first arm and biased into engagement with said back-up roller to define a first bight and cut roving passing therethrough, said cutter roller having a plurality of cutting blades mounted on the periphery thereof to cut the roving on the bias, a second opening in said mounting plate adjacent said back-up roller, a second arm spring mounted on said plate and extending into said second opening, a pressure roller supported by said second arm and biased into engagement with said back-up roller to define a second bight, and feed roving to said bight, the rotational axes of all rollers being parallel, an enclosure over said rollers coacting with said plate to define a cutting chamber and having a substantially continuous arcuate wall extending parallel to said roller axes and closely adjacent the outer peripheries thereof, an inlet opening in said wall aligned with the second bight to receive and guide roving into said cutting chamber and into said second bight, an air nozzle communicating with said air exhaust directing a stream of air into said chamber and toward the inlet of said first bight to guide roving thereinto, and a discharge opening in said enclosure wall aligned with the second bight to discharge cut roving from the chamber.

2. A roving cutter as defined in claim 1, and a blower nozzle arranged within said chamber adjacent said wall and the pressure and cutter rollers for discharging air in opposite directions along said wall to guide the discharge of cut roving.

3. A roving cutter as defined in claim 1, and means for adjusting the tension of the spring for said first arm to adjust the pressure of said cutter roller on said back-up roller.

4. A roving cutter comprising: a back-up roller having a resilient peripheral surface; a cutter roller; means for driving one of said rollers; means for spring mounting one of said rollers substantially parallel to the other of said rollers and into biasing engagement with the other of said rollers to define a first bight for cutting roving passing therethrough; means for adjusting the pressure exerted by said spring mounting means; means for co-acting with said adjusting means to determine the cutting pressure; a pressure roller; and means for mounting said pressure roller substantially parallel to said back-up roller for engagement with said back-up roller to define a second bight for feeding roving therethrough and into said first bight.

5. A roving cutter as in claim 4 wherein said cutter roller is spring mounted.

References Cited
UNITED STATES PATENTS

| | | | |
|---|---|---|---|
| 2,507,779 | 5/1950 | Gault | 30—123.3 |
| 2,787,314 | 4/1957 | Anderson | 30—180 X |
| 2,861,340 | 11/1958 | Hazzard | 30—180 X |
| 3,011,257 | 12/1961 | Bamberger | 30—128 |
| 3,025,195 | 3/1962 | Kozma | 30—180 X |
| 3,034,213 | 5/1962 | Milligan | 30—128 |
| 3,103,304 | 9/1963 | Nawalanic | 30—128 X |
| 3,117,376 | 1/1964 | Nawalanic | 30—180 |

ROBERT C. RIORDON, Primary Examiner

J. C. PETERS, Assistant Examiner

UNITED STATES PATENT OFFICE
CERTIFICATE OF CORRECTION

Patent No. 3491443          Dated January 27, 1970

Inventor(s) MORRIS FRAM

It is certified that error appears in the above-identified patent and that said Letters Patent are hereby corrected as shown below:

Inventor's address should be --Shadow-- not "Shadon"

Col. 4, line 41, "cuter" should be --cutter--
(Specification page 10, line 18)

Col. 8, line 8, insert --first-- after "said"
(Claim 1, line 17)

SIGNED AND
SEALED
JUN 23 1970

(SEAL)
Attest:

Edward M. Fletcher, Jr.
Attesting Officer

WILLIAM E. SCHUYLER, JR.
Commissioner of Patents